United States Patent [19]

Wall et al.

[11] 3,880,943
[45] Apr. 29, 1975

[54] HIGHLY FLUORINATED ORGANIC COMPOUNDS AND SYNTHESIS OF PERFLUOROSTYRENE

[75] Inventors: Leo A. Wall, McLean, Va.; Joseph M. Antonucci, Hyattsville, Md.

[73] Assignee: The United States of America as represented by the Secretary of the Navy, Washington, D.C.

[22] Filed: Jan. 13, 1970

[21] Appl. No.: 2,657

Related U.S. Application Data

[62] Division of Ser. No. 301,681, Aug. 12, 1963, Pat. No. 3,513,206.

[52] U.S. Cl............ 260/651 F; 260/618; 260/91.5; 260/601; 260/633; 260/653; 260/653.3; 260/653.5
[51] Int. Cl............................................. C07c 25/28
[58] Field of Search................................. 260/651 F

[56] References Cited
UNITED STATES PATENTS
3,187,058   6/1965   Patrick et al.................. 260/651 F

*Primary Examiner*—D. Horwitz
*Attorney, Agent, or Firm*—R. S. Sciascia; Arthur L. Branning

[57] ABSTRACT

New fluorinated substituted ethylenic compounds which are 2,3,4,5,6-pentafluoro-α-(trifluoromethyl) benzyl alcohol, (1,2,2,2-tetrafluoroethyl)perfluorobenzene and (1-bromo-1,2,2,2-tetrafluoroethyl)perfluorobenzene. The new compounds are useful as intermediates in the preparation of perfluorostyrene. Pyrolysis of the aforesaid perfluorobenzenes gives perfluorostyrene and of the first of these perfluorobenzenes, α-hydroheptafluorostyrene, also.

2 Claims, No Drawings

HIGHLY FLUORINATED ORGANIC COMPOUNDS AND SYNTHESIS OF PERFLUOROSTYRENE

STATEMENT OF GOVERNMENT INTEREST

The invention described herein may be manufactured and used by or for the Government of the United States of America for governmental purposes without the payment of any royalties thereon or therefor.

This application is a division of our copending application Ser. No. 301,681, filed Aug. 12, 1963 now U.S. Pat. No. 3,513,206, and is related to our copending application Ser. No. 167,195, filed Jan. 18, 1962, now U.S. Pat. No. 3,265,746, granted Aug. 9, 1966.

This invention relates to the synthesis of α-hydroheptafluorostyrene and octafluorostyrene (perfluorostyrene) and to new fluorinated substituted ethylenic compounds which are useful in the synthesis.

The possibility of obtaining a thermally-stable and radiation-resistant material which is a polymer of perfluorostyrene has stimulated the invention of the improved methods herein described for the preparation of the monomer. The invention also comprehends the production of related compounds which are useful as a precursor for the production of perfluorostyrene.

An object, therefore, of the present invention is the preparation of perfluorostyrene.

Another object of the invention is the preparation of intermediates for the production of perfluorostyrene and α-hydroheptafluorostyrene.

The invention will be better understood by reference to the following detailed description.

Perfluorostyrene has been synthesized according to methods described in the aforementioned related application and in the publication (3) of Tatlow and co-workers. According to the present invention, new methods are presented not only for the preparation of perfluorostyrene but of another highly fluorinated styrene, namely, (2,2-difluorovinyl)perfluorobenzene (α-hydroheptafluorostyrene). The various synthesis schemes employed for the synthesis of these two monomers are shown in Tables 1 and 2.

In Method A, addition of trifluoroacetaldehyde to the pentafluorophenyl Grignard reagent, prepared from bromopentafluorobenzene, (4,5) gave, after hydrolysis, a readily sublimable, white crystalline solid, which was characterized as the new compound, 2,3,4,-5,6-pentafluoro-α-(trifluoromethyl)benzyl alcohol (I). This alcohol is readily purified by sublimation under autogenous pressure using very moderate heating. The yield of purified alcohol was 53% based on the quantity of bromopentafluorobenzene used. Subsequent treatment of (I) with excess sulfur tetrafluoride (6) using n-pentane as a diluent gave a smooth conversion in 90% using n-pentane as a diluent gave a smooth conversion in 90% yield to the previously unknown (1,2,2,-2-tetrafluoroethyl)perfluorobenzene (II), b.p. 116°–118°C.

The final step in this synthesis, dehydrofluorination of (II), proved to be quite difficult. Chemical dehydrofluorination did not appear too promising. Dropping compound (II) into molten potassium hydroxide gave either no reaction or a dark tarry mass, depending on the contact time (cf. Method B'). The use of hot aqueous or alcoholic bases was avoided, since nucleophilic displacement of the aromatic fluorine atoms and/or solvolysis of the trifluoromethyl group might occur.

In view of the difficulty of chemical dehydrofluorination, thermal dehydrofluorination was undertaken. The pyrolysis of (II) under various temperatures and pressures was explored in order to determine the optimum conditions for the formation of perfluorostyrene. Most of the pyrolyses were conducted in iron tubes free of inert packing. In one case, an iron tube packed with steel gauze was employed. A few pyrolyses were conducted in Vycor tubes packed with glass helices. The various pyrolyzates, after distillation, were examined by vapor-phase chromatography, infrared spectroscopy, and mass spectroscopy. Vapor-phase chromatographic analysis revealed tnat, in all cases, the principal component of the pyrolyzate was unchanged (II). The conversion to products, as determined by vapor-phase chromatography, was low (10 to 25%). However, in most cases, the material recovery was excellent.

Under relatively mild conditions of pyrolysis (400°–500°C) under nitrogen at one atmosphere, the conversion was quite low (about 10%). However, apparently only a single product was formed. Infrared spectral analysis of the distilled pyrolyzate revealed a band at 1740 cm$^{-1}$ which indicated the presence of a fluorinated vinyl group in the product.

Under more severe conditions of pyrolysis (500°–600°C at 760 mm, 600°–850°C at 0.2 to 5mm), the conversion was increased to about 15 to 25%, but now two products were formed. One of the products was formed in very high yield (90–95%) and the other in very low yield (5–10%). The product present in greater amount was shown to be identical with the product formed under mild conditions. Infrared spectral analysis of the pyrolyzate revealed a strong band at about 1740 cm$^{-1}$ and a weak band at about 1780 cm$^{-1}$, indicative of the presence of fluoro-olefinic groups. Isolation of the individual components of the pyrolyzates by preparative vapor-phase chromatography was rendered difficult by the closeness of their retention times and the rather small quantity of one of the products. However, the products were isolated free of the starting compound by this means. Mass-spectrometric analysis of a sample of the products indicated the presence of a small amount of a substance having a parent mass peak at 248, corresponding to $C_8F_8$ and a larger quantity of material having a parent mass peak at 230, corresponding to $C_8HF_7$.

The major product was (2,2-difluorovinyl)perfluorobenzene (IV) and the minor product was perfluorostyrene (III). The infrared bands at 1740 cm$^{-1}$ and 1780 cm$^{-1}$ are then attributable to —CH=CF$_2$ and —CF=CF$_2$ groups, respectively.

Under still more severe conditions (850°–950°C, 760 mm to 0.1 mm), other products, in addition to the two styrenes, began to appear, probably as a result of secondary reactions and thermal fragmentation of the (1,-2,2,2-tetrafluoroethyl)perfluorobenzene (II).

From these experiments, it was concluded that the pyrolysis of (II) in an iron tube results in more defluorination than dehydrofluorination. It has been observed in certain other cases that defluorination may predominate over dehydrofluorination. For example, the pyrolysis of 4-hydrononafluorocyclohexene was reported by Tatlow and co-workers to yield mainly pentofluorobenzene, although some hexafluorobenzene is also produced (7).

Since defluorination appeared to occur more readily than dehydrofluorination, it was thought that bromination of (II) and subsequent pyrolysis of the bromo derivative would provide a good route to perfluorostyrene (Method A'). As expected, the bromination of (II) required high temperatures, and the method of Simons et al. (8) had to be employed. This procedure involves passing bromine and the fluorocarbon through a Pyrex or Vycor tube packed with glass helices or the like and heated to a temperature of 500° to 550°C. The yield of the (1-bromo-1,2,2,2-tetrafluoroethyl)perfluorobenzene (V) was 73%, based on the amount of (II) consumed. Only about 10% of (II) was recovered unchanged. Compound (V) was allowed to vaporize through an iron tube packed with steel gauze heated between 600° and 650°C at 0.1 mm pressure. A high conversion to a clear, colorless liquid was obtained. Vapor-phase chromatographic analysis of the pyrolyzate indicated that it was essentially one component. The retention time of this component was identical with that of the perfluorostyrene prepared by the dehydrohalogenation techniques (Methods A, B, and B'). Moreover, a sample purified by preparative vapor-phase chromatography gave the same infrared pattern and mass spectrogram found for the perfluorostyrene prepared by the other methods. The yield of perfluorostyrene from (V) was 95%.

Table 1. Monomer Synthesis

Method A

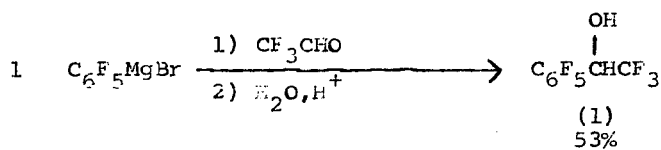

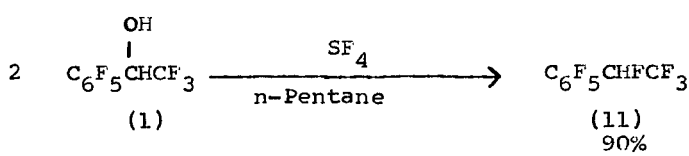

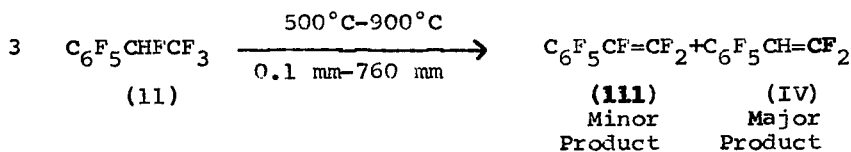

Method A'

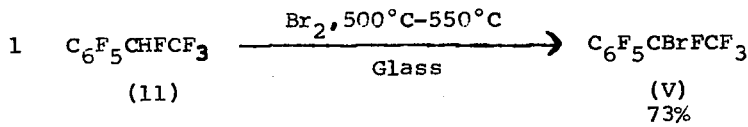

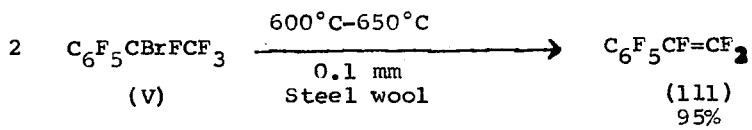

Table 2. Monomer Synthesis

Method B

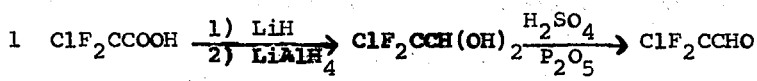

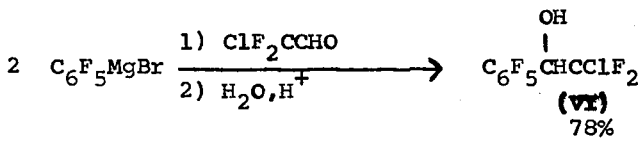

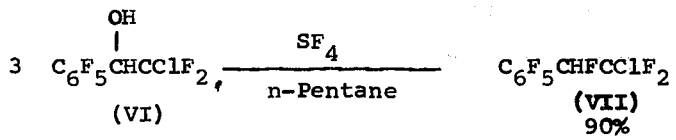

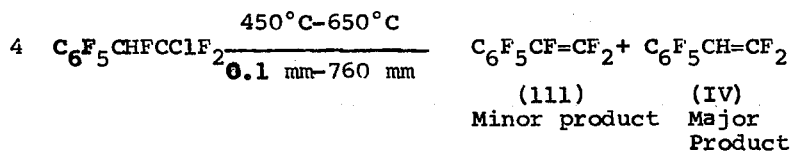

Method B'

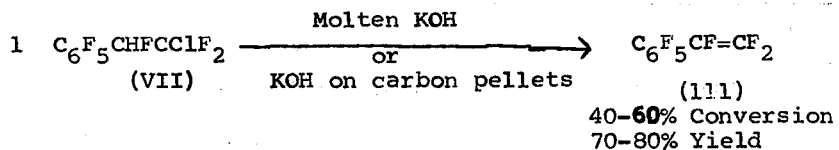

40-60% Conversion
70-80% Yield

EXPERIMENTAL

Method A

1. Synthesis of 2,3,4,5,6-Pentafluoro-α-(trifluoromethyl)-benzyl Alcohol (I).

The Grignard reagent of bromopentafluorobenzene was prepared from 43g (0.17 mole) of bromopentafluorobenzene, according to the procedure developed at the National Bureau of Standards (4) and at the University of Birmingham (5). The preparation was performed in a 500-ml three-necked flask equipped with a motor-driven, Teflon-blade stirrer, a pressure-equalized dropping funnel carrying a nitrogen inlet tube, and a low-temperature condenser fitted with a drying tube, a low-temperature trap, and a second drying tube. The condenser and the trap were cooled by means of a slurry of dry ice-acetone and the entire apparatus was swept out with a stream of nitrogen during the course of the reaction. After the Grignard reagent had been prepared, the flask was cooled to −78°C and excess trifluoroacetaldehyde was added as a gas by means of a tube leading into the flask. The trifluoroacetaldehyde was prepared from 50g (0.43 mole) of trifluoroacetaldehyde hydrate (Columbia Organic Co., Inc.) by dehydration, using a vigorously stirred slurry of 22g of phosphorous pentaoxide and 83 ml of 97% sulfuric acid heated (9) at 90° C. The aldehyde was collected in a trap cooled to −78°C, and then distilled into a second trap also cooled to −78°C and finally into the cooled flask containing the Grignard reagent. The mixture in the flask was constantly stirred during the addition of the aldehyde and all subsequent operations. After the addition was completed, the contents of the flask were allowed to come to room temperature and then heated under reflux for 1 hour. The mixture was allowed to stand at room temperature overnight. After decomposition of the dark-brown complex with 5% aqueous sulfuric acid, the aqueous layer was separated from the ether layer and extracted several times with ether. The ether extracts and ether layer were combined, washed with a saturated sodium bicarbonate solution, then with a saturated sodium chloride solution, and finally dried over anhydrous sodium sulfate overnight.

After removal of the drying agent by filtration, the ether was removed by distillation using a 16-inch Vigreux column. A fraction (about 25 g), b.p. 35°–100°C, was then collected. Vapor-phase chromatographic analysis revealed that this fraction was a mixture composed mainly of ethyl ether and pentafluorobenzene, along with a lesser quantity of bromopentafluorobenzene. The pot residue (a dark-brown solid) did not lend itself too well to fractional distillation under reduced pressure because of its facile sublimation. Consequently, the solid, dark residue was sublimed under autogenous pressure using a water bath heated between 50° to 75°C. A white, crystalline solid, m.p. 65°–67°C, was obtained. The low carbon analysis (see below) may be attributable to a small quantity of trifluoroacetaldehyde hydrate which apparently co-sublimes with the alcohol. Infrared spectral analysis showed a band at 3480 cm$^{-1}$ attributable to the hydroxyl group and a strong doublet at approximately 1500 cm$^{-1}$ which is characteristic of skeletal vibrations of the pentafluorophenyl ring. Mass spectrometry gave peaks indicative of the assigned structure of the carbinol. The yield of the purified alcohol was 27 g (53%).

Elemental analysis gave: C, 35.1; H, 0.8; F, 56.5. $C_8H_2F_8O$ requires: C, 36.1; H, 0.8; F, 57.1.

2. Synthesis of (1,2,2,2-Tetrafluoroethyl)perfluorobenzene (II).

In a 180-ml silver-lined bomb was placed 27 g (0.10 mole) of alcohol (I) in 90 ml of freshly distilled n-pentane. The bomb was sealed and fitted with a needle valve. After cooling to −80°C, the bomb was evacuated to about 1 mm, filled with nitrogen and then re-evacuated. This procedure was repeated several times. About 25 g (0.23 mole) of sulfur tetrafluoride (6) was then added to the cooled evacuated bomb. The valve was closed and the bomb was heated in a shaker with moderate heating (50°–85°C) for 12 to 15 hours. The bomb was vented in a hood through a series of traps to remove excess sulfur tetrafluoride and hydrogen fluoride. The first two traps were polypropylene suction flasks connected by stainless-steel tubing fitted with rubber stoppers. The first trap served as a back-up trap and the second was cooled to about −80°C. The last trap was a 4-liter glass suction flask containing about a liter of potassium hydroxide solution (10%). After the bomb was vented, the contents were poured into a polypropylene beaker and allowed to sit in the hood until the escape of fumes subsided. The yellow liquid was then carefully distilled through a 16-inch glass-helix packed column. After the n-pentane was removed, about 24 g of clear colorless liquid, b.p. 116°–118°C, was collected. Vapor-phase chromatography indicated that the product was highly pure (> 97%). Mass spectrometry gave peaks which confirmed the assigned structure for compound (II). Infrared spectrometry revealed a weak band at 2950 cm$^{-1}$ attributable to the $$\diagup CHF$$

structure (10) and a strong band in the region 1490–1530 cm$^{-1}$ attributable to the pentafluorophenyl ring.

3. Pyrolysis of (1,2,2,2-Tetrafluoroethyl)perfluorobenzene (II).

The usual pyrolysis apparatus consisted of an iron tube, usually unpacked, fitted with 24/40 standard-taper Monel (inner) joints at both ends. The 24-in by ⅝-in tube was centered in a vertical position in an electric furnace having a heated zone of about 11 inches. The lower joint of the tube was attached to three traps in series by means of a vacuum adapter fitted with a water-jacketed 24/40 standard-taper Pyrex female joint. The last trap was connected either to a vacuum pump or to a drying tube, depending on whether reduced or atmospheric pressure was employed. The traps were cooled by liquid nitrogen or dry ice-acetone. The upper joint of the tube was attached, by means of a second adapter fitted with a water-jacketed 24/40 standard-taper Pyrex female joint, to either a pressure-equalized dropping funnel or to a small vacuum-distillation flask. The dropping funnel arrangement was only employed for pyrolysis under nitrogen at atmospheric pressure. The temperature was measured by a thermocouple placed on the outer wall of the tube in the central portion of the heated zone. The pyrolyses conducted in glass tubes (Pyrex or Vycor tubes, 24-in by 1-in with 24/40 standard-taper joints at both ends) employed a similar set-up, except that the tube was packed with enough Pyrex helices to occupy the lower three-quarters of the heated zone (about 7–8 inches).

Two typical pyrolyses are described below:

a. Pyrolysis of (II) at 500°C and One Atmosphere Pressure Over Steel Gauze.

Approximately 4.0 g of compound (II) was dropped through an iron tube heated at 500°C and packed loosely with enough clean steel wool that about three-quarters of the heated zone was filled. The rate of addition was approximately one drop per second. The entire pyrolysis was conducted under a slow nitrogen stream at one atmosphere pressure. The pale-yellow pyrolyzate (3.7 g) was analyzed by vapor-phase chromatography, using a column 24 in. by ¼ in. filled with a packing of 30% silver nitrate-triethylene glycol on 60/80 mesh Chromosorb P. The chromatogram revealed that essentially two components were present in the pyrolyzate. The ratio of the peak areas indicated that one component formed about 85 to 90% of the mixture. This compound has the same retention time as the starting material. An infrared spectrogram of the pyrolyzate revealed a band at 1740 cm$^{-1}$ not present in the spectrum of compound (II). A change in the band at 2950 cm$^{-1}$ also occurred. Enough of the new compound was isolated by preparative vapor-phase chromatography to permit obtaining a mass spectrogram; this gave a parent mass peak at 230. The product formed on pyrolysis was compound (IV) and the infrared band at 1740 cm$^{-1}$ is attributable to —CH=CF$_2$.

b. Pyrolysis of (II) at 700°C and 4.0 mm Pressure in an Unpacked Iron Tube.

Approximately 3.0 g of compound (II) was allowed to vaporize into an unpacked iron tube at 700°C using reduced pressure (3.5–4.0 mm). Infrared spectral analysis of the pyrolyzate revealed a strong new band at 1740 cm$^{-1}$ and a weak band at 1780 cm$^{-1}$. Vapor-phase chromatography revealed the presence of three components. The major component (~75%) of the pyrolyzate was the starting compound (II). The major product (~20%) had the same retention time as compound (IV) above. The new product was present in the smaller quantity (~5%) and is presumably responsible for the infrared band at 1780 cm$^{-1}$. A mass spectrogram of a mixture of the products (obtained free from starting material by preparative vapor-phase chromatography) revealed a weak mass peak at 248 and a very strong mass peak at 230. The new product is perfluorostyrene (III) and the band at 1780 cm$^{-1}$ is attributable to $-CF=CF_2$.

A 24-in by ¼-in column filled with a packing of 30% silicone oil (Dow Corning 550) on 40/60 mesh acid-washed firebrick was used in the vapor-phase chromatographic analyses.

Method A'

1. Synthesis of (1-Bromo-1,2,2,2-tetrafluoroethyl) perfluorobenzene (V).

The method of Simons et al (8) was employed to convert (II) into its bromo derivative. The reaction apparatus consisted of a Vycor tube 24-in by 1-in packed with Pyrex glass helices to a height of 8 inches. Since the (1,-2,2,2-tetrafluoroethyl)perfluorobenzene and bromine were not very miscible, it was necessary to drop the fluorocarbon and the bromine simultaneously through the reactor. Two pressure-equalized dropping funnels were connected to the top of the tube by means of an adapter. At the lower end was placed a receiver which, in turn, was connected to two traps in series. The receiver was cooled by ice water and the traps by a slurry of dry ice-acetone. About 2g of compound (II) and 10g of bromine were dropped simultaneously under a stream of nitrogen through the tube heated to 550°C. The dark-red liquid which was collected in the receiver and first trap was then carefully distilled through a 4-inch glass-helix packed column to remove most of the bromine. The column was removed and the residue was rapidly distilled to give 2.3g of a pale-yellow liquid, b.p. 142°–158°C. Vapor-phase chromatography revealed two main peaks. The minor component (about 10%) of the mixture was unreacted α-hydrononafluoroethylbenzene. The major component has a much longer retention time and was the brominated ethylbenzene. The crude bromo compound was purified by preparative vapor-phase chromatography to give 1.9g (73% yield) of compound (V). Mass spectrometry confirmed the structure assigned to compound (V).

2. Pyrolysis of (1-bromo-1,2,2,2-tetrafluoroethyl)perfluorobenzene (V).

Compound (V) was debromofluorinated by allowing about 1.9g of it to vaporize into an iron tube (18-in by ⅝-in) packed with steel wool or gauze throughout the heated zone (12 inches) and heated to 640°C. The reaction was carried out under reduced pressure (0.1 to 0.2 mm). A clear, colorless liquid (1.3g) was collected. Vapor-phase chromatography revealed that the liquid was essentially one component. The retention time was much less than that of the starting material and corresponded to the perfluorostyrene obtained by the dehydrohalogenation techniques. Infrared spectrometry revealed strong bands at 1780°cm$^{-1}$ and at about 1500 cm$^{-1}$, corresponding to the $-CF=CF_2$ group and $C_6F_5$-group, respectively. Mass spectrometry also confirmed the assigned structure; the yield was 95%.

Chemical analysis: Theory for $C_8F_8$: C, 38.7; F, 61.3%. Found: C, 38.3; F, 57.7%.

Literature References

1. Antonucci, J. M., Straus, S., Tryon, M., and Wall, L. A., "Degradation of Poly-2,3,4,5,6-pentafluorostyrene," Proc. Sym. Polymer Degradation, Soc. of Chem. Ind., Monograph No. 13, 295 (1961).
2. Brown, D. W., Florin, R. E., and Wall, L. A., J. Research Natl. Bur. Standards, 64A, 269 (1960).
3. Letchford, B. R., Patrick, C. R., Stacey, M., and Tatlow, J. C., Chem. Ind. (London), 32, 1472 (1962).
4. Pummer, W. J., and Wall, L. A., J. Research Natl. Bur. Standards, 63A, 167 (1959).
5. Nield, E., Stephens, R., and Tatlow, J. C., J. Chem. Soc. 166 (1959).
6. Englehardt, V. A., Hasek, W. R., and Smith, W. C., J. Am. Chem. Soc., 82, 543 (1960).
7. Coe, P. L., Patrick, C. R., and Tatlow, J. C., Tetrahedron, 9, 240 (1960).
8. Brice, T. J., Pearlson, W. H., and Simons, J. H., U.S. Pat. No. 2,658,928 (1953).
9. Braid, M., Iserson, H., and Lawlor, E. E., J. Am. Chem. Soc., 76, 4027 (1954).
10. Nield, E., Stephens, R., and Tatlow, J. C., J. Chem. Soc., 3800 (1960).

Since modifications and variations in the practice of the methods of the invention are possible in the light of the above teaching without departing from the spirit or scope of the invention, it is intended that the invention shall not be limited except as is required by the appended claims.

What is claimed and desired to be secured by Letters Patent of the United States is:

1. (1,2,2,2-tetrafluoroethyl) perfluorobenzene.

2. A method of making perfluorostyrene and α-hydroheptafluorostyrene which comprises pyrolyzing (1,2,2,2-tetrafluoroethyl) perfluorobenzene at a temperature from 500°C to 900°C.

* * * * *